(12) United States Patent
Raza et al.

(10) Patent No.: US 10,595,103 B2
(45) Date of Patent: Mar. 17, 2020

(54) SYSTEM FOR INCREASING FIBER PORT DENSITY IN DATA CENTER APPLICATIONS

(71) Applicant: Fiber Mountain, Inc., Cheshire, CT (US)

(72) Inventors: Mohammad H. Raza, San Jose, CA (US); David G. Stone, Irvine, CA (US); Aristito Lorenzo, Plantsville, CT (US); Ronald M Plante, Prospect, CT (US)

(73) Assignee: FIBER MOUNTAIN INC., Cheshire, CT (US)

( * ) Notice: Subject to any disclaimer, the term of this patent is extended or adjusted under 35 U.S.C. 154(b) by 0 days.

(21) Appl. No.: 16/524,519

(22) Filed: Jul. 29, 2019

(65) Prior Publication Data

US 2020/0029137 A1 Jan. 23, 2020

Related U.S. Application Data

(63) Continuation of application No. 14/868,707, filed on Sep. 29, 2015, now Pat. No. 10,382,845.

(Continued)

(51) Int. Cl.
*H04Q 11/00* (2006.01)
*H04B 10/40* (2013.01)
*G02B 6/38* (2006.01)
*G02B 6/42* (2006.01)
*G02B 6/36* (2006.01)

(52) U.S. Cl.
CPC ....... *H04Q 11/0066* (2013.01); *G02B 6/3885* (2013.01); *G02B 6/4292* (2013.01); *H04B 10/40* (2013.01); *G02B 6/3664* (2013.01); *G02B 6/3897* (2013.01); *H04Q 2011/0016* (2013.01)

(58) Field of Classification Search
CPC ........... H04Q 11/0066; H04Q 11/0005; H04Q 11/0062; H04Q 11/0001; G02B 6/3885; G02B 6/4292; H04B 10/40; H04J 14/0212; H04J 14/0227
See application file for complete search history.

(56) References Cited

U.S. PATENT DOCUMENTS

| 5,101,151 A | 3/1992 | Beaufils et al. |
| 5,457,556 A | 10/1995 | Shiragaki |

(Continued)

FOREIGN PATENT DOCUMENTS

| GB | 2414347 | 11/2005 |
| WO | 2013171042 A1 | 11/2013 |

OTHER PUBLICATIONS

International Search Report and Written Opinion, mailed in PCT/US2015/052847 by ISA/US dated Jun. 30, 2016.

(Continued)

*Primary Examiner* — Ted M Wang
(74) *Attorney, Agent, or Firm* — Wissing Miller LLP

(57) ABSTRACT

A data center network device provides configurations where the port density can be increased by incorporating multiport transceivers within the device and the use of high density fiber connections on exterior panels of the device. The device also permits dynamically reassigning fiber connections to convert from single fiber connection paths to higher rate bonded fiber paths while at the same time making more efficient use of the fiber interconnections.

19 Claims, 12 Drawing Sheets

Related U.S. Application Data

(60) Provisional application No. 62/057,008, filed on Sep. 29, 2014.

(56) References Cited

U.S. PATENT DOCUMENTS

| | | |
|---|---|---|
| 5,493,565 A | 2/1996 | Hanson et al. |
| 5,838,681 A | 11/1998 | Bonomi et al. |
| 5,892,770 A | 4/1999 | Wolf et al. |
| 6,067,585 A | 6/2000 | Hoang |
| 6,188,702 B1 | 2/2001 | Tometta et al. |
| 6,243,510 B1 | 6/2001 | Rauch |
| 6,980,725 B1 | 12/2005 | Swieconek |
| 7,226,217 B1 | 6/2007 | Benton et al. |
| 7,277,425 B1 | 10/2007 | Sikdar |
| 7,492,714 B1 | 2/2009 | Liao et al. |
| 7,606,494 B1 | 10/2009 | Weston Dawkes et al. |
| 7,772,975 B2 | 8/2010 | Downie et al. |
| 7,782,202 B2 | 8/2010 | Downie et al. |
| 7,965,186 B2 | 6/2011 | Downie et al. |
| 8,138,925 B2 | 3/2012 | Downie et al. |
| 8,264,366 B2 | 9/2012 | Chamarti et al. |
| 8,421,626 B2 | 4/2013 | Downie et al. |
| 8,965,203 B1 | 2/2015 | Vahdat |
| 9,159,012 B2 | 10/2015 | Downie et al. |
| 2001/0015839 A1 | 8/2001 | Koh |
| 2003/0026205 A1 | 2/2003 | Mullendore |
| 2003/0030866 A1 | 2/2003 | Yoo |
| 2004/0029417 A1 | 2/2004 | Engle |
| 2004/0088444 A1 | 5/2004 | Baumer |
| 2004/0160917 A1 | 8/2004 | Eliznd |
| 2006/0018329 A1 | 1/2006 | Nielsen et al. |
| 2006/0148279 A1 | 7/2006 | German et al. |
| 2006/0186926 A1 | 8/2006 | Yager |
| 2006/0251419 A1 | 11/2006 | Zadikian et al. |
| 2007/0291535 A1 | 12/2007 | Eberle |
| 2008/0101229 A1 | 5/2008 | Meleis et al. |
| 2009/0074414 A1 | 3/2009 | Miles et al. |
| 2009/0226181 A1 | 9/2009 | Fingler et al. |
| 2010/0098412 A1 | 4/2010 | Boyd |
| 2010/0211664 A1 | 4/2010 | Raza |
| 2010/0129078 A1 | 5/2010 | Weston-Dawkes et al. |
| 2010/0142544 A1 | 6/2010 | Chapel et al. |
| 2010/0211665 A1 | 8/2010 | Raza |
| 2010/0211697 A1 | 8/2010 | Raza |
| 2010/0215049 A1 | 8/2010 | Raza et al. |
| 2010/0266117 A1 | 10/2010 | Enge et al. |
| 2011/0092100 A1 | 4/2011 | Coffey et al. |
| 2011/0116748 A1 | 5/2011 | Smrha et al. |
| 2011/0188383 A1 | 8/2011 | Koziy |
| 2011/0228473 A1 | 9/2011 | Anderson |
| 2011/0255829 A1 | 10/2011 | Anderson |
| 2012/0008945 A1 | 1/2012 | Singla et al. |
| 2012/0069839 A1 | 3/2012 | Kunz |
| 2012/0219005 A1 | 8/2012 | Durve et al. |
| 2012/0243554 A1 | 9/2012 | Sybesma |
| 2012/0246362 A1 | 9/2012 | Anne |
| 2013/0148976 A1 | 6/2013 | Patel |
| 2013/0177309 A1 | 7/2013 | El-Ahmadi et al. |
| 2013/0179622 A1 | 7/2013 | Pratt et al. |
| 2013/0194005 A1 | 8/2013 | Voutilainen et al. |
| 2014/0019662 A1 | 1/2014 | Coffey |
| 2014/0036920 A1 | 2/2014 | McCormick |
| 2014/0270762 A1 | 9/2014 | Li et al. |
| 2014/0317249 A1 | 10/2014 | Janakiraman |
| 2016/0020858 A1* | 1/2016 | Sipes, Jr. .............. H04B 10/808 398/45 |

OTHER PUBLICATIONS

International Search Report and Written Opinion, mailed in PCT/US2015/052924 by ISA/US dated Feb. 2, 2016.

International Search Report and Written Opinion, mailed in PCT/US2016/026714 by ISA/US dated Jul. 12, 2016.

International Search Report and Written Opinion, mailed in PCT/US15/12795 by ISA/US dated May 18, 2015.

International Search Report and Written Opinion, mailed in PCT/US15/23077 by ISA/US dated Jul. 7, 2015.

International Search Report and Written Opinion, mailed in PCT/US15/39045 by ISA/US dated Oct. 2, 2015.

LHCB Online System Data Acquisition & Experiment Control, 2001, [retrieved on Sep. 4, 2015] retrieved from the internet URL: http://lhcb-comp.web.cem.ch/lhcb-comp/General/Publications/onlinetdr.pdf.

\* cited by examiner

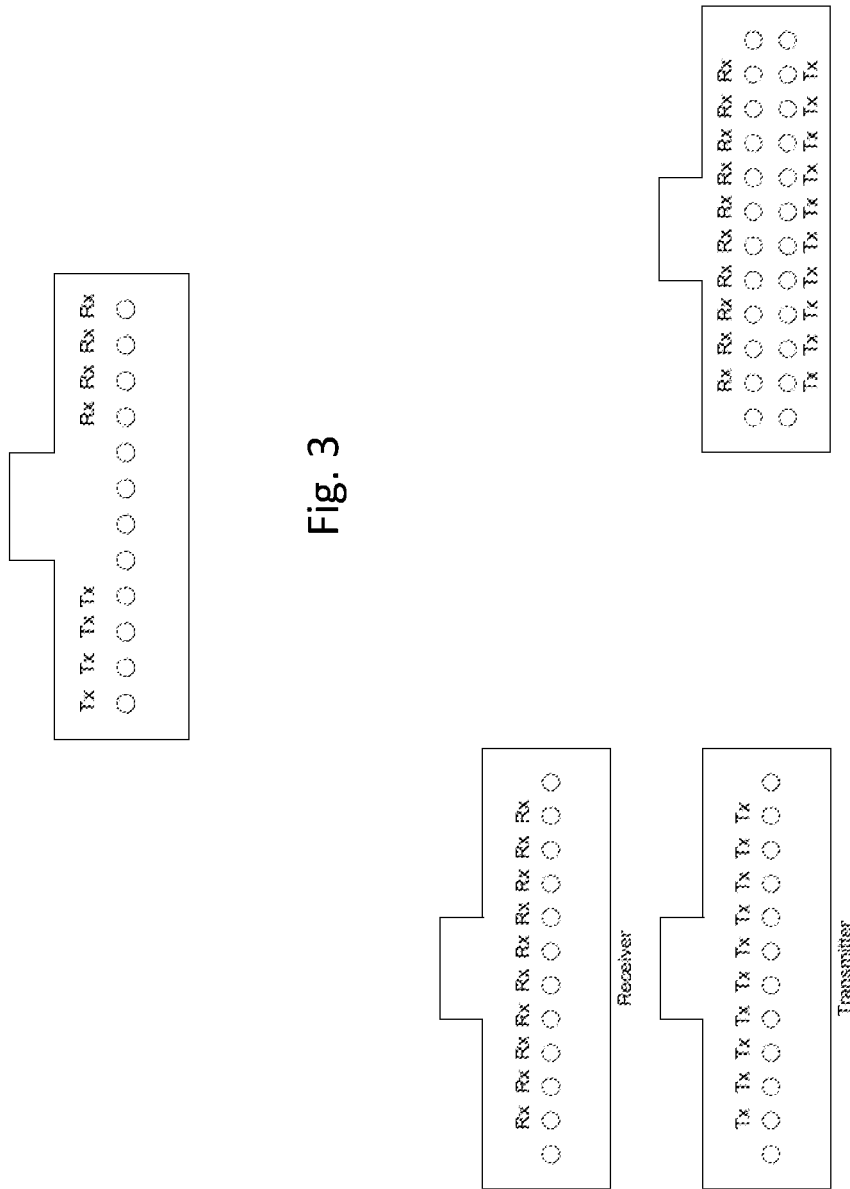

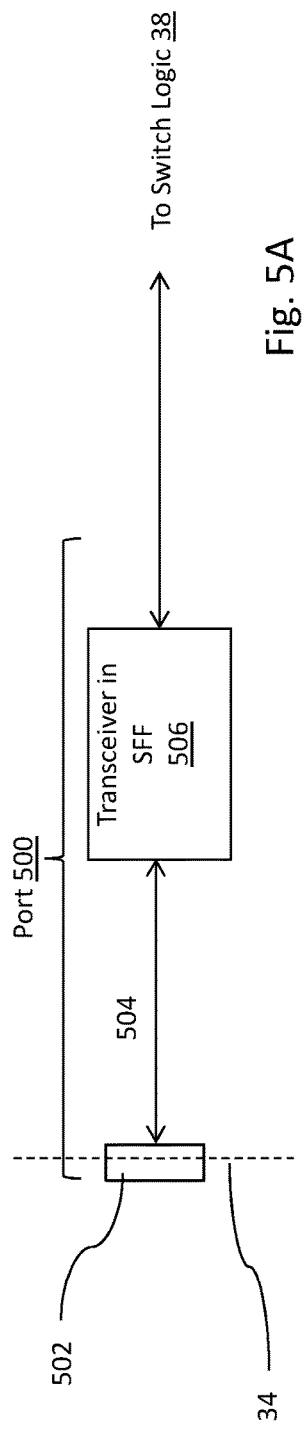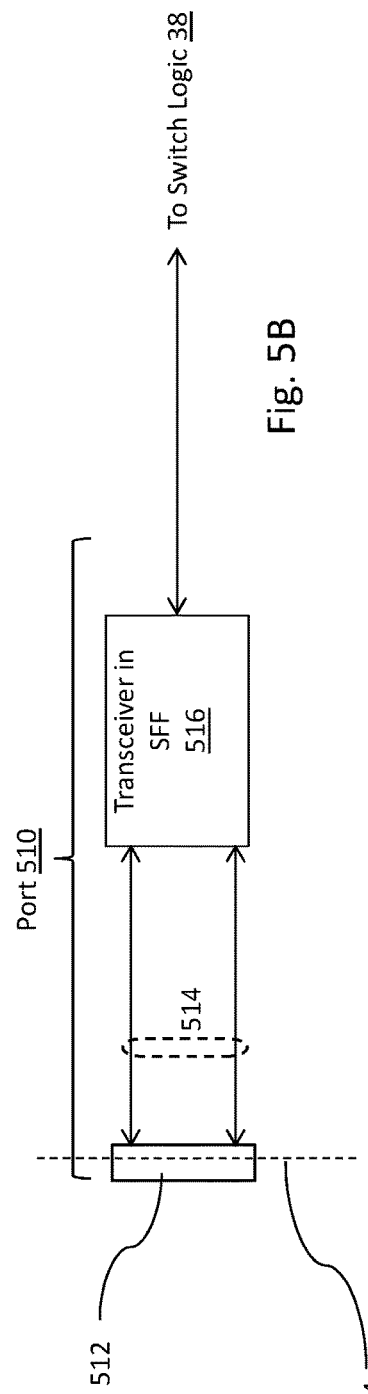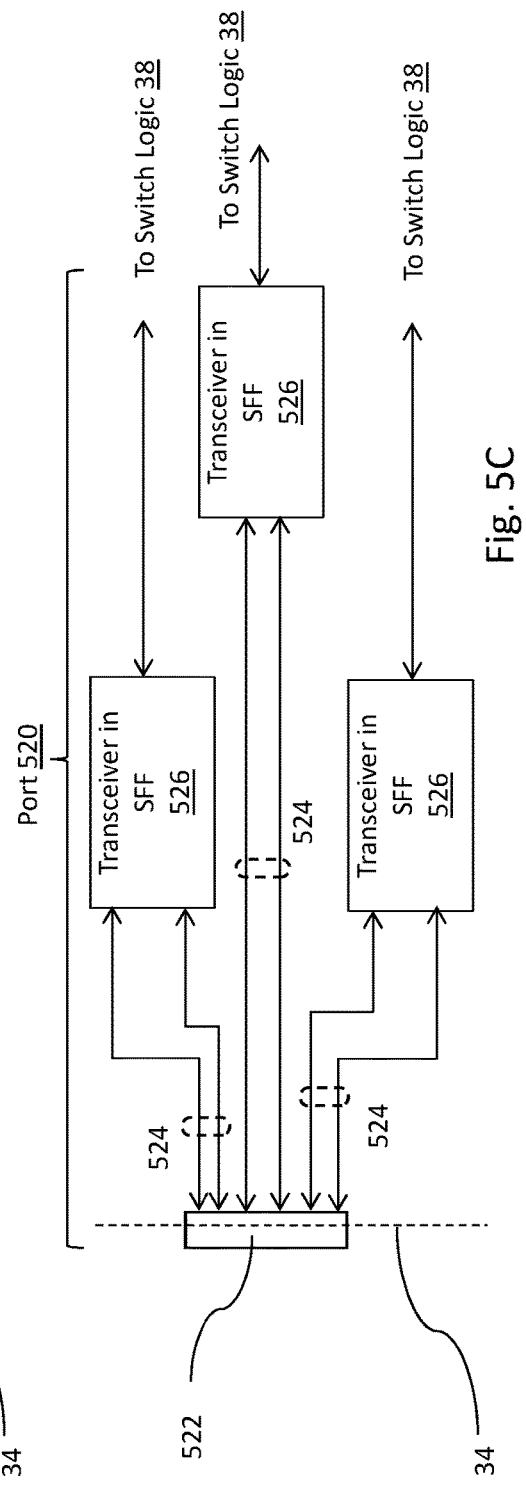

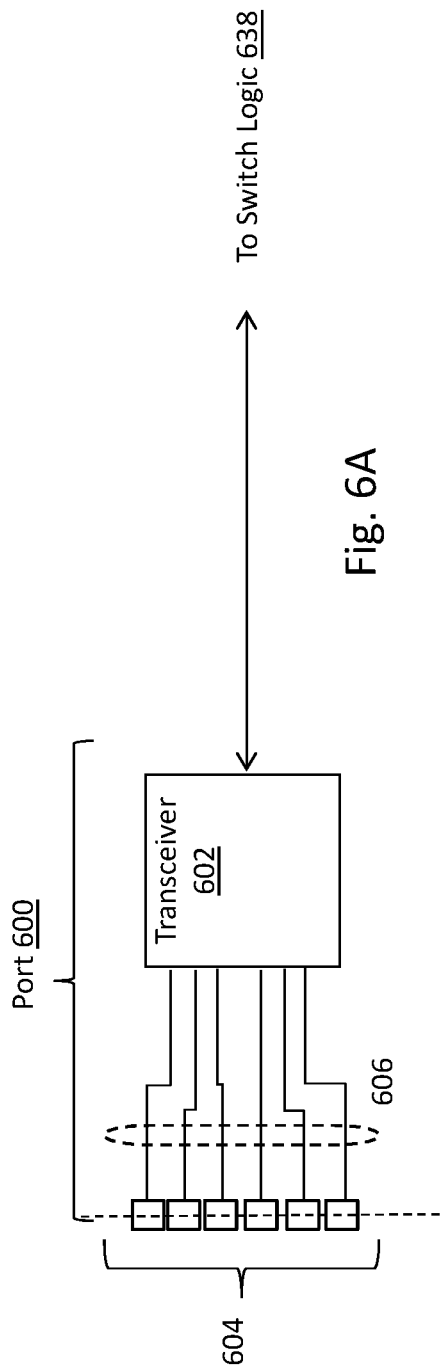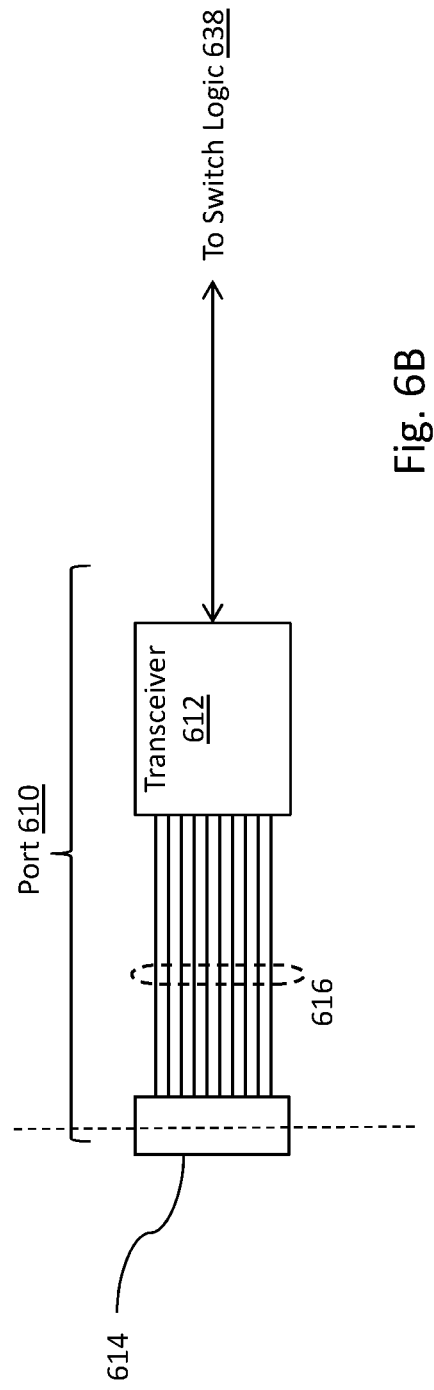

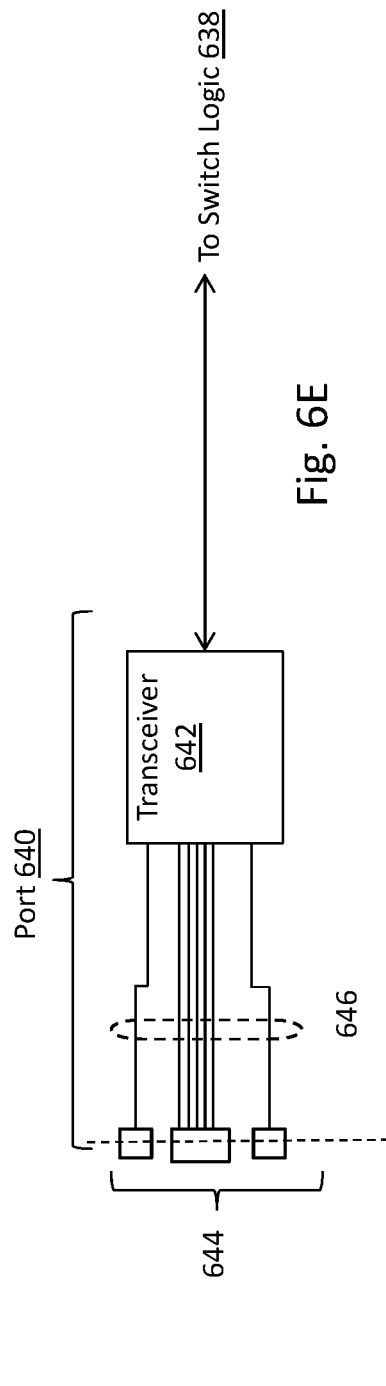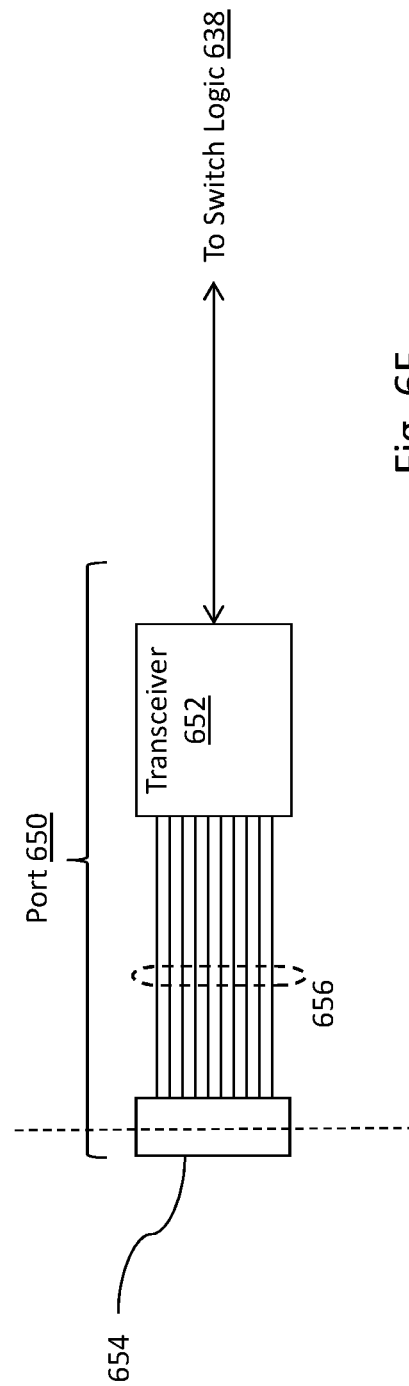

SYSTEM FOR INCREASING FIBER PORT DENSITY IN DATA CENTER APPLICATIONS

CROSS-REFERENCE TO RELATED APPLICATIONS

This application is a continuation of co-pending application Ser. No. 14/868,707 filed on Sep. 29, 2015 (now U.S. Pat. No. 10,382,845), and claims benefit from U.S. Provisional Application Ser. No. 62/057,008, filed on Sep. 29, 2014 the contents of both are incorporated herein in their entirety by reference.

BACKGROUND

Field

The present application relates generally to network equipment typically used in data centers, and more particularly to network devices with increased port density and efficiency.

Description of the Related Art

Traditionally, data center network devices, such as servers, storage devices, switches, and routers, as well as NIC cards that may be added to such devices have physical connection points to transmit and receive data. These connection points generally include a transceiver and a connector, which are often referred to as a port. Ports can be copper or fiber ports that are built into the device, or the ports can be plug-in modules that contain the transceiver and connector and that plug into Small Form Factor (SFF) cages intended to accept the plug-in transceiver/connector module, such as SFP, SFP+, QSFP, CFP, CXP, and other transceiver/connector modules, where the connector extends from an exterior surface of the device, e.g., from a front panel. Fiber ports may be low density or single fiber ports, such as FC, SC, ST, LC, or the fiber ports may be higher density MPO, MXC, or other high density fiber ports.

Fiber optic cabling with the low density FC, SC, ST, or LC connectors or with SFP, SFP+, QSFP, CFP, CXP or other modules either connect directly to the data center network devices, or they pass through interconnector cross connect patch panels before getting to the data center network devices. The cross connect patch panels have equivalent low density FC, SC, ST, or LC connectors, and may aggregate individual fiber strands into high density MPO, MXC or other connectors that are primarily intended to reduce the quantity of smaller cables run to alternate panels or locations.

FIG. 1 shows a prior data center network device 10, that is a network switch, with ports 110, each having a transceiver 111 and connector 112, mounted internally to the device 10, such that the connector extends out of a front or rear panel of the device. CPU 102 configures switch logic 104 to direct internal data streams (not shown) out via paths 108 through transceiver 111 and connector 112 in port 110. Ports 110 may be copper or fiber ports. Typically, a copper cable (cable 114A) is terminated with an RJ-45 connector (connector 116A), while fiber cable (cable 114B) is terminated with an FC, SC, ST, or LC connector (cable 116B).

FIG. 2 shows a prior data center network device 20 where SFF cages 118 and 124 are mounted within the device 20, typically to a front or rear panel, and external transceiver/connector modules can be inserted into SFF cages 118 or 124. CPU 102 configures switch logic 104 to direct internal data streams (not shown) out via paths 108 through transceiver 121 and connector 122, or through transceiver 126 and connector 128. In this configuration, connectors 122 can consist of either single copper RJ-45 connectors, or single or duplex fiber connectors. Duplex fibers in this case are for bidirectional path communications. Connectors 128 can consist of multi-fiber connectors, such as MPO multifiber connectors.

Using SFP or SFP+ transceiver modules permits a single connection to be configured between two data center network devices at data rates of up to 10 Gbps. Using QSFP, CFP, CXP, or other transceivers permits a single connection to be configured between two data center network devices at data rates of up to and beyond 100 Gbps.

MPO multifiber connectors are used for IEEE 802.3ba industry standard 40 Gbps and 100 Gbps bandwidth fiber connections. FIG. 3 shows IEEE 802.3ba 40GBASE-SR4 optical lane assignments where 40 Gbps bandwidth is achieved by running four fibers of 10 Gbps in one direction (Tx) for the 40 Gbps transmit path, and four fibers of 10 Gbps in the other direction (Rx) for the 40 Gbps receive path. This means four fibers in the 12 fiber MPO are unused, thus decreasing connector and cable efficiency.

100 Gbps bandwidth fiber connections are achieved by running 10 fibers of 10 Gbps in one direction (Tx) for the 100 Gbps transmit path, and 10 fibers of 10 Gbps in the other direction (Rx) for the 100 Gbps receive path. FIG. 4A shows two IEEE 802.3ba 100GBASE-SR10 optical lane assignments for 12 fiber MPO's, where one MPO uses 10 fibers of 10 Gbps for the 100 Gbps transmit path (Tx), leaving 2 fibers unused, and the other MPO uses 10 fibers of 10 Gbps for the 100 Gbps receive path (Rx), leaving 2 fibers unused, again decreasing connector and cable efficiency. FIG. 4B shows a 24 fiber MPO, where 10 fibers of 10 Gbps are used for the 100 Gbps transmit path (Tx), plus 10 fibers of 10 Gbps are used for the 100 Gbps receive path (Rx), leaving a total of 4 unused fibers, again decreasing connector and cable efficiency.

There also exists a standard for 100 Gbps transmission which uses four 25 Gbps fiber data rate connections configured similar to the 40 Gbps standard, where eight fibers (four transmit and four receive fibers) are used in a 12 fiber MPO. Implementing this standard means that four fibers in a 12 fiber MPO are not used, again decreasing connector and cable efficiency.

In each of these cases, the industry standard method of migrating from a 10 Gbps connection to a 40 Gbps or 100 Gbps connection, or from a 40 Gbps connection to a 100 Gbps connection requires reconfiguring the fiber transmit and receive paths by physically changing the ports within the data center network devices increasing the cost to run the data center. Adding further to the cost to run the data center is that this change has to occur at both ends of the path (i.e., the receive port and the transmit port) as well as the cabling there between.

In many cases, the entire data center network device has to be upgraded as the transceiver/connector configuration of FIG. 1, or the transceiver/connector/SFF cage configuration of FIG. 2 cannot support the higher data rate speeds on the additional fiber ports associated with 40 Gbps or 100 Gbps ports. Further, in each of the configurations described above, fibers are left unused in the connectors and cables, thus wasting resources and unnecessarily increasing costs for the higher fiber cabling and connectors. To illustrate, connector 132 (seen in FIG. 2) is a 12 fiber MPO connector and fiber cable 130 is a 12 fiber cable. To use this cable and connector in a 40 Gbps or 100 Gbps application would leave 2 or 4 fibers unused, depending upon the type of port used.

Further, in current network devices the ports 110 (i.e., the transceiver 111 and connector 112 in FIG. 1, or the transceiver 121, connector 122 and SFF cage 118 in FIG. 2) are connected directly to front or rear panels of the network device. The physical size of the transceiver or SFF module significantly limits the number of connectors 112 or cages 118 that can be installed on the front or rear panels of the network device, thus limiting the ability to cost effectively increase port density.

SUMMARY

The present application relates generally to data center network device architectures that implement high density ports, low density ports and combinations of high density and low density ports, for effective use of data center network device panel space thus increasing port density without the need to replace network devices, connectors and/or transceivers. Data center network devices contemplated by the present application include servers, storage devices, NIC cards, switches, and routers.

By separating the transceivers from the panel connectors as disclosed herein, the present application introduces new methods for increasing the density of the optical interface circuitry within data center network devices to achieve higher density on the device front panel. Additionally, by using combinations of ports, dynamic mixing of speeds of fiber connections within high density fiber connectors on a per fiber basis can be achieved.

Port configurations disclosed in the present application also provides discovery of end-to end connectivity through the use of managed connectivity cable methods such as 9$^{th}$ wire, CPID, and other methods. Knowledge of the end to end physical configurations in one or more paths, including the discovery of per port path connectivity permits data center management on a per port and per cable connector basis, including the ability to identify changes in state of a physical connection in real time.

An exemplary embodiment of a data center network device according to the present application includes, a housing having one or more connection panels, and a set of ports. Each port within the set of ports is configured to receive data streams from an external medium and to transmit data streams to an external medium, and includes a connector and at least one transceiver optically coupled to the connector. The connector is mounted to the connection panel, and the at least one transceiver is mounted within the housing such that the at least one transceiver is separated from the connector. The at least one transceiver may be mounted to a circuit board within the housing or plugged into a cage, e.g., an SFF cage, mounted within the housing. The connector is optically coupled to the at least one transceiver using fiber cables and/or optical waveguides.

The transceivers employed in the present application may be low density transceivers, high density transceivers, or combinations of low density transceivers and high density transceivers. Examples of transceivers that may be used in the present application include, SFP, SFP+, QSFP, CFP, CXP, and WDM transceivers, and if the transceiver is pluggable in a cage, the cage would be a compatible cage for the transceiver used.

BRIEF DESCRIPTION OF THE DRAWINGS

FIG. 3 shows IEEE 802.3ba 40GBASE-SR4 optical lane assignments;

FIGS. 4A and 4B show IEEE 802.3ba 100GBASE-SR10 optical lane assignments;

FIGS. 5A-5C are block diagrams of exemplary embodiments of the different internally mounted insertable ports used in the data center network device of FIG. 5;

FIGS. 6A-6G are block diagrams of exemplary embodiments of the different internally mounted insertable ports used in the data center network device of FIG. 6;

DETAILED DESCRIPTION

In this disclosure, references to input and output, transmit and receive are used as references to simplify explanations. In actual practice, inputs may be outputs, they may switch direction from the output side to the input side, or they may be bidirectional signals. This is similar for the terms transmit and receive.

Figure 1:
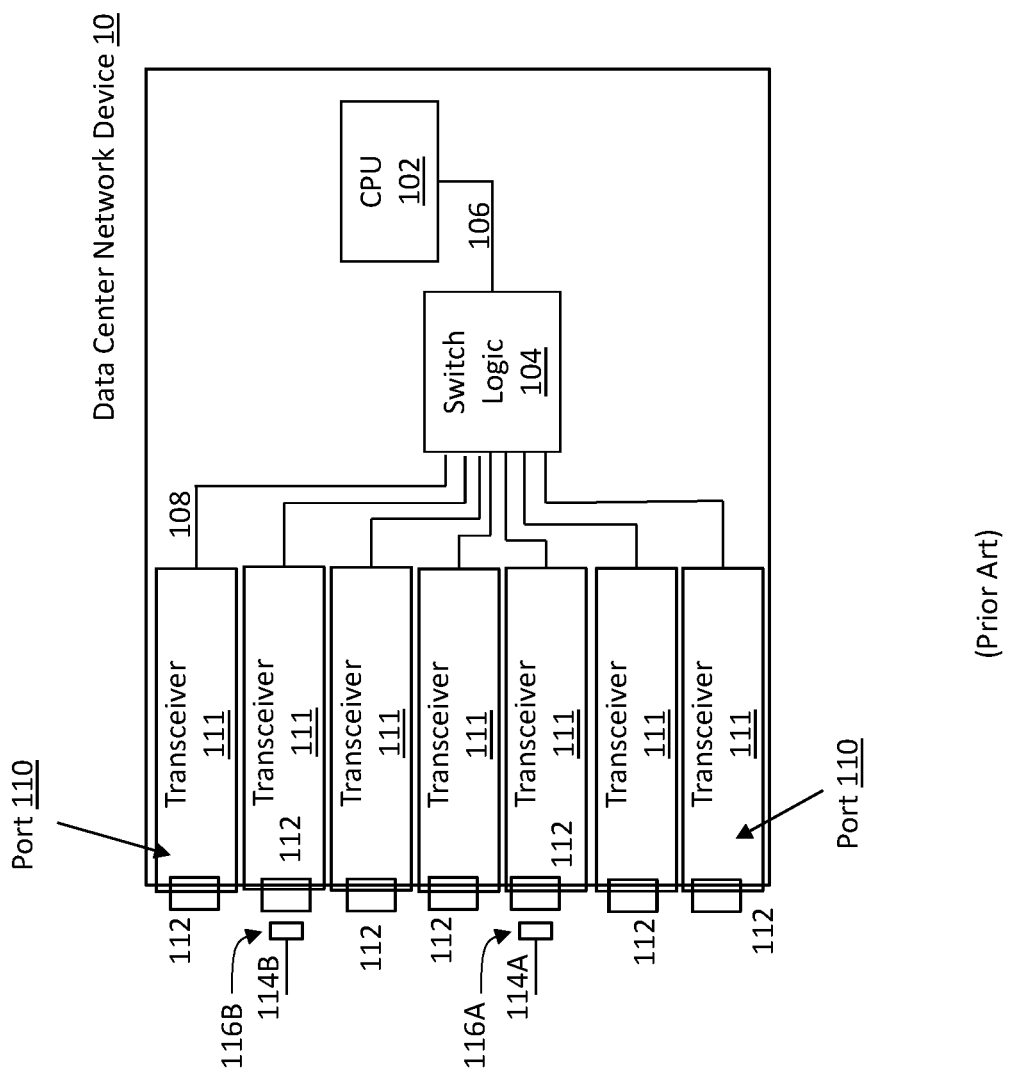
FIG. 1 is a block diagram of a prior data center network device architecture with internal ports.
Figure 2:
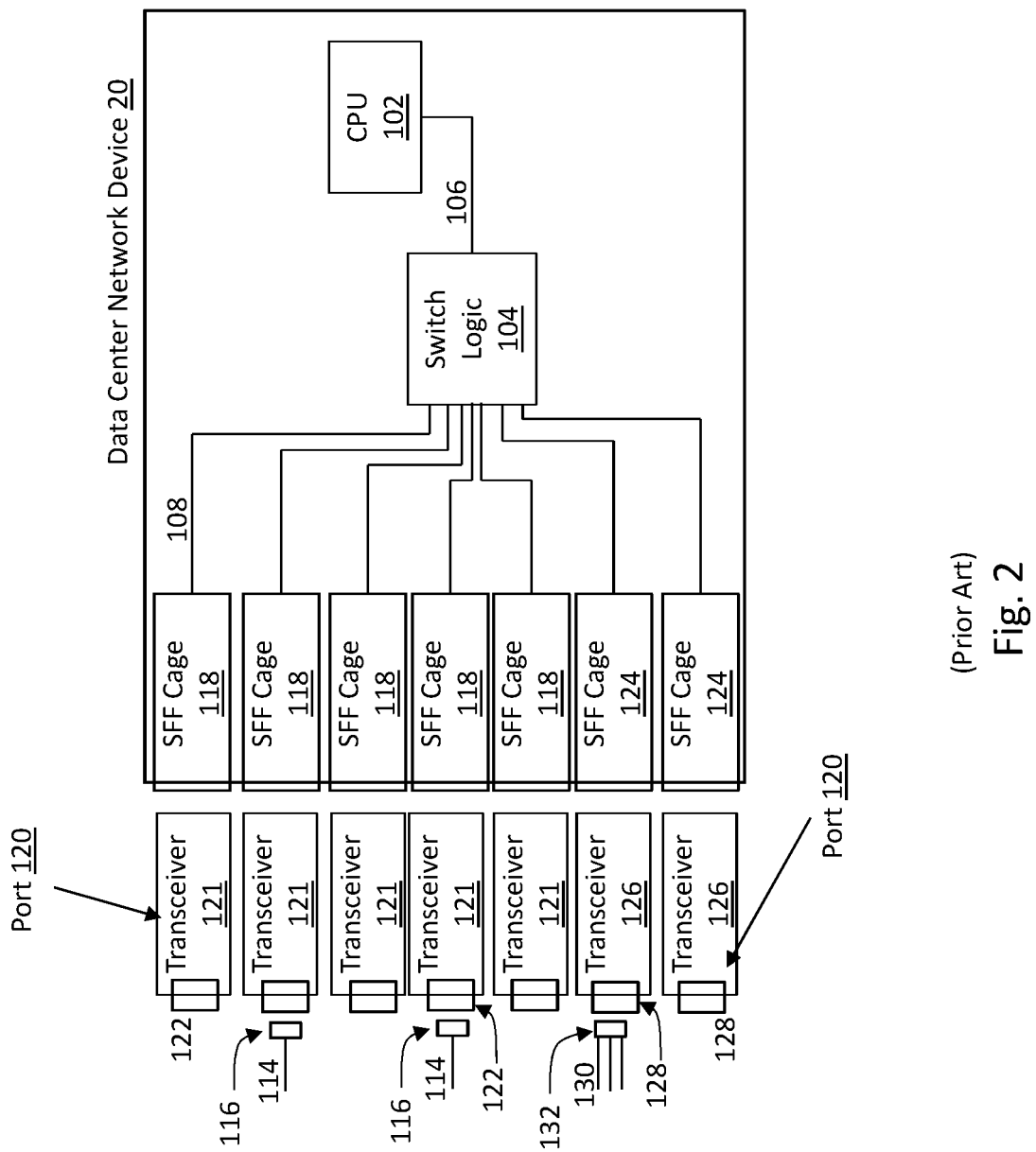
FIG. 2 is a block diagram of a prior data center network device architecture with external insertable ports.
Figure 5:
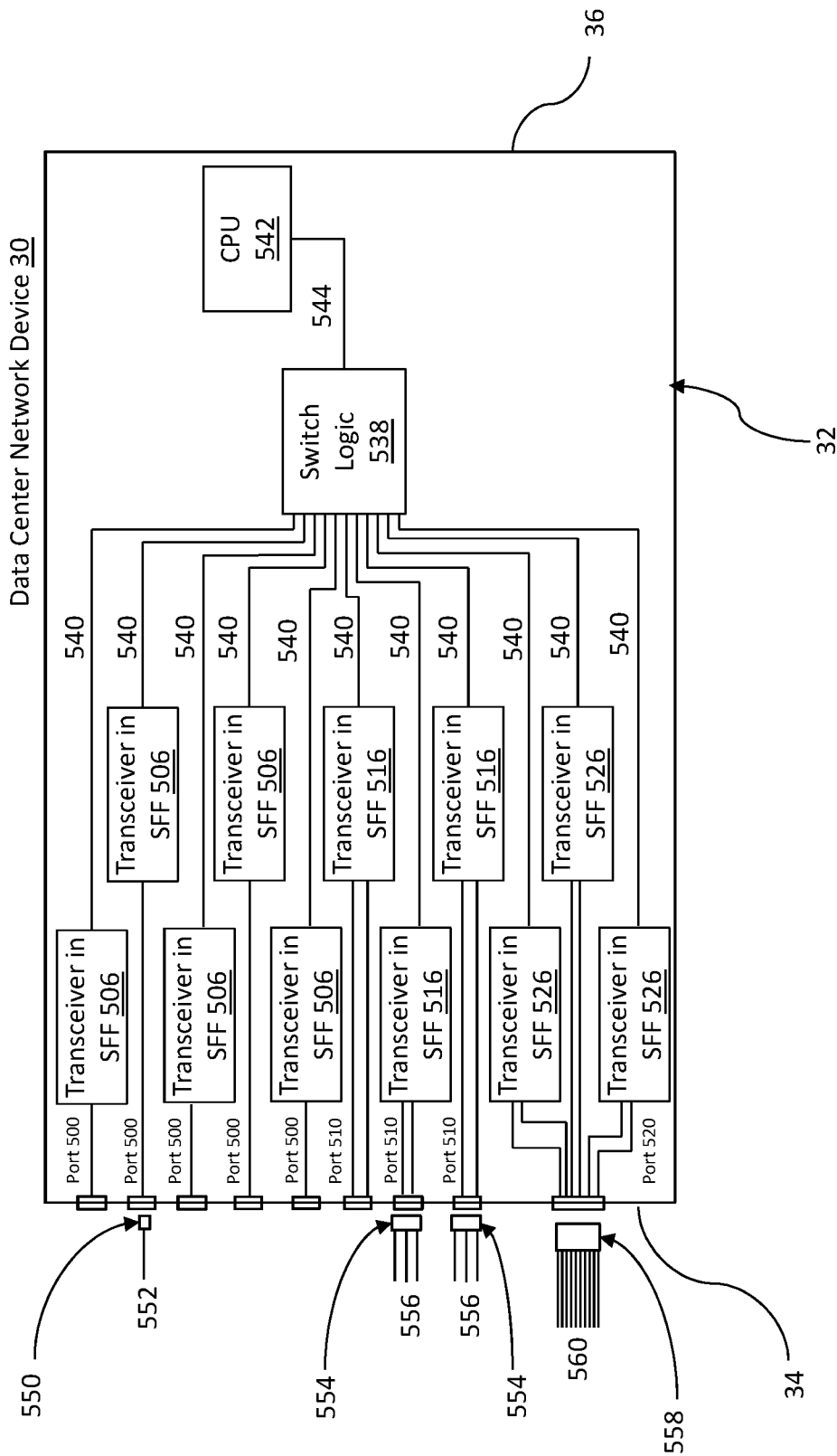
FIG. 5 is a block diagram of an exemplary embodiment of a data center network device according to the present application with internally mounted insertable ports.

Referring to FIG. 5, an exemplary high density data center network device 30 is shown. In this embodiment, the data center network device 30 is a network switch. However, the device 30 may be a server, storage device, NIC card, router or other data center network device.

In the embodiment of FIG. 5, the data center network device 30 includes a housing 32 for installation in a rack within the data center. The housing includes a front panel 34 and a rear panel 36 that can be used as a connection point for external connection to other data center network devices. To connect the data center network device 30 with other data center network devices, a set of ports is used for transmitting and receiving of data streams between the data center network device 30 and other external data center network devices. As noted, the data center network device in the embodiment of FIG. 5 is a switch, which includes switch logic 538 connected to each port via interconnections 540, and a CPU 542 connected, via interconnection 544, to the switch logic 538. The CPU 542 is configured to control the switch logic 538, and thus the flow of data streams from one port to the same or another port within the switch.

The ports that may be used in the set of ports contemplated by the present application may vary. For the purpose of this application, a port includes any of the port types described herein, but this disclosure is not intended to limit the ports contemplated herein and are provided as exemplary embodiments for the ports that may be used. Referring to FIGS. 5A-C, three different port types 500, 510 and 520 are employed to further increase the panel density in the embodiment of FIG. 5. The first port type 500, shown in FIG. 5A, is a low density port having a low density panel connector 502, a compatible low density cable 504 connected between the connector 502 and a compatible low density transceiver in SSF 506 mounted within the housing 32. The low density panel connector 502 is preferably an FC, SC, ST, LC, or other type of single or duplex fiber connector, and the compatible low density transceiver in SFF 506 is an SFP, SFP+, or other type of single or duplex fiber transceiver plugged into an SFF cage configured to receive the pluggable transceiver. External connections to the low density ports 500 are with single fiber or duplex fiber cables 552 using FC, SC, ST, LC, or other types of single or duplex fiber connector 550.

The second port type employed in the embodiment of FIG. 5 is a high density port 510, shown in FIG. 5B, having panel connector 512, and a compatible high density cable 514 connected between the connector 512 and a compatible high density transceiver in SFF 516 mounted within the housing 32. The high density panel connector 512 is preferably an MPO, MXC or other high density multi-fiber panel connector used for industry standard 40 Gbps and 100 Gbps applications, and the compatible high density transceiver in SFF 516 is a QSFP, CFP, CXP type, or other high density pluggable transceiver used for industry standard 40 Gbps and 100 Gbps applications plugged into an SFF cage configured to receive the pluggable transceiver. This configuration is to support industry standard 40 Gbps and 100 Gbps using 10 Gbps data rates per fiber, or 100 Gbps using 25 Gbps data rates per fiber employed. To support the industry standard application of 40 Gbps or 100 Gbps, panel connector 512 is configured according to industry standard fiber configurations. External connections to the high density ports 510 are with multi-fiber cables 556 using MPO, MXC or other high density multi-fiber connectors 554.

The third port type employed in the embodiment of FIG. 5 is a high density port 520, shown in FIG. 5C, having panel connector 522, multiple compatible high density cables 524 connected between the connector 522 and multiple compatible high density transceivers in SFF 526 mounted within the housing 32. The high density panel connector 522 is a multi-fiber MPO or MXC type panel connector coupled to the multiple compatible high density transceivers in SFF 526, such as SFP, SFP+, QSFP, CFP, CXP type, or other high density transceivers plugged into an SFF cage configured to receive the pluggable transceiver. The third port configuration permits multiple simplex or duplex fiber communications paths from one or more transceivers in SFF 526 to a single MPO or MXC connector 522 independent of each other. External connections to the high density ports 520 are with multi-fiber cables 558 using MPO, MXC or other high density multi-fiber connectors 560.

The pluggable transceivers used in each port may be low density or high density transceivers or a combination of low density and high density transceivers. A transceiver has a receiver which receives a data stream from an external medium connected to the data center network device 30, and a transmitter which transmits a data stream to the external medium connected to the data center network device. Examples of low density transceivers include SFP, SFP+ type transceivers, and examples of high density transceiver include QSFP, CFP, CXP type, or other high density transceivers. Transceiver chips, such as the FTLX8571D3BCV, manufactured by Finisar Corp. may be employed as the low density transceiver, and transceiver chips, such as the FTLQ8181EBLM, also manufactured by Finisar Corp. may be employed as the high density transceiver.

It should be noted that the present application is not limited to connectors, transceivers and/or SSF cage configurations capable of supporting data rates of up to 100 Gbps. The embodiments of the present application can also support data rates greater then 100 Gbps.

In the embodiment of FIG. 5, the transceivers in SFF 506, 516 and 526 are configured in the housing in a staggered arrangement away from the front panel 34 (or rear panel 36) such that each transceiver in SFF is not connected directly to the front panel 34. Only the connectors 502, 512 and 522 are connected to the front panel 34 (or rear panel 36) of the housing 32. This configuration allows more connectors to be connected to the front panel of the device 30, thus increasing the panel density of the device.

The data center network device 30 of the present application permits multiple 10 Gbps, 40 Gbps, and 100 Gbps connections in the same high density connectors 522. Currently, high density MPO connectors can support up to 72 fibers, while high density MXC connectors can support up to 64 fibers. As such, the fiber cable group 560, for example, can fan out to as many ports needed to support the desired fibers for the high density connector 558. The fibers in cable 560 may all terminate into a single data center network device at a remote end of the cable 560, or may be split up via interconnect panels, cross connect panels, hydra cables or other devices capable of splitting the fiber cables, such that the fiber ends are physically routed to different data center network devices. By employing a combination of low and high density ports in the embodiment of FIG. 5, and the staggered transceiver module arrangement, the fiber count is significantly increased, thus further increasing the panel density.

Figure 6:
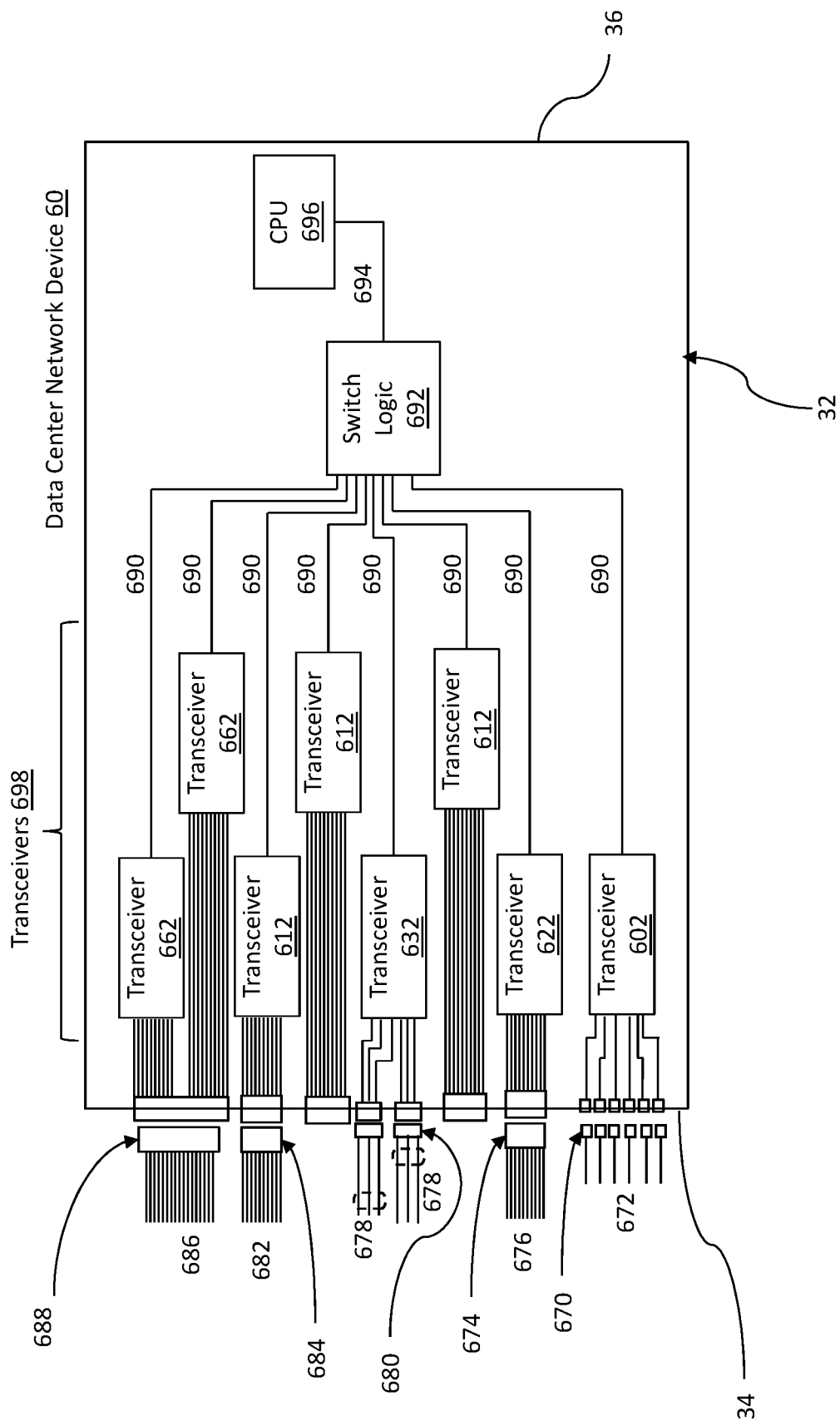
FIG. 6 is a block diagram of another exemplary embodiment of a data center network device according to the present application with internal high density ports.

Referring now to FIG. 6, another embodiment of a data center network device according to the present application is disclosed. In this embodiment, the data center network device 60 is a network switch. However, the device 60 may be a server, storage device, NIC card, router or other data center network device. The data center network device 60 includes a housing 32, for installation in a rack within the data center. The housing 32 includes a front panel 34 and a rear panel 36 that can be used as a connection point for external connection to other data center network devices. To connect the data center network device 60 with other data center network devices, a set of ports is used for transmitting and receiving of data streams between the data center network device 60 and other external data center network devices. As noted, the data center network device in the embodiment of FIG. 6 is a switch, which includes switch logic 692 connected to each port via interconnect 690, and a CPU 696 connected, via interconnect 694, to the switch logic 692. The CPU 696 is configured to control the switch logic 692, and thus the flow of data streams from one port to the same or another port within the switch.

The ports that may be used in the set of ports contemplated by the present application may vary. For the purpose of this application, a port includes any of the port types described herein, but this disclosure is not intended to limit the ports contemplated herein and are provided as exemplary embodiments for the ports that may be used. FIG. 6 shows several embodiments of transceiver and port connections with additional details of these embodiments shown in FIGS. 6A-6D and 6G, and with additional embodiments shown within FIGS. 6E and 6F. These transceivers are collectively referred herein as transceivers 698 for ease of reference.

Individual 10 Gbps ports can be dynamically bonded together to create 40 Gbps ports and/or to create 100 Gbps ports to form multifiber connections between data center network devices. This capability enables data centers to dynamically scale from using data center network devices that operate using 10 Gbps ports to data center network devices that operate using 40 Gbps, 100 Gbps ports, or ports with data rates greater than 100 Gbps. Further, the ports of the present application permit the use of all fibers in the IEEE802.3ba 40GBASE-SR4 optical lane assignments or IEEE802.3ba 100GBASE-SR10 optical lane assignments within the connector and allow data center network devices, e.g., interconnect panels and switches, to separate individual links from bonded links. This also permits the expansion of high density fiber configurations, e.g., 12 fiber MPO configurations, to 24, 48, 72, or greater high density fiber combinations in order to support multi-rate and multi-fiber applications in the same connector. This capability also permits the expansion of high density fiber configuration, e.g., 12 fiber MPO configurations, to MXC or other high fiber count configurations without the need for predefined bonding for multi-fiber applications in the same connector.

Additionally, by utilizing data center network devices according to the present application, such as interconnect panels and switches, to bond and un-bond fiber pairs, the data center network device can create bonded pairs that traverse multiple connectors. In most cases for this type of application, the two or more separate paths can be configured such that the connection medium is the same, and the overall length of each path is substantially the same to minimize differential delays.

A further capability of the data center network device of the embodiment of FIG. 6, is the capability to permit multiple 10 Gbps, 40 Gbps, and 100 Gbps connections in the same high density connectors. By incorporating transceivers 698, which in this embodiment are multiport transceivers, connected via interconnect 690 to common switch logic 692, CPU 696 can program switch logic 692 to dynamically map the individual ports to a fiber cable such that all the fibers can be used within the connector to provide multi-rate communications capabilities within the same connector for different connection paths.

In one embodiment, switch logic 692 can be configured to provide a fixed data reception and transmission rate from one transceiver port to another transceiver port. In another embodiment, the switch logic 692 can be programmed by CPU 696 to receive one data rate from one receiver port and transmit out at a different rate on a different transmit port. The transceivers 698 and switch logic 692 provide the data rate retiming and data buffering necessary to support different rate transmit and receive connections.

Referring to FIGS. 6A-6G, multiple different port types, some of which are shown in FIG. 6, are employed to further increase the panel density. These may be implemented as a single embodiment for a particular data center network device, or more than one embodiment may be implemented in a data center network device. The first port 600, shown in FIG. 6A, includes a multi-port transceiver 602 and single or duplex fiber panel adapters 604, such as FC, SC, ST, LC, or other type of single or duplex fiber panel adapters. The transceiver 602 is connected to the panel adapter 604 via interconnect 606. Interconnect 606 may be an optical fiber cable, optical waveguide, or other mechanism to couple the optical signals between the transceiver 602 and the front panel 34 (or rear panel 36) mounted fiber connector 604. This configuration is an example of a multi-port transceiver 602 configured as individual fiber connections independent of each other. One advantage of this configuration is that the port density can be much greater since the individual multi-port transceiver 602 occupies less printed circuit board real estate than multiple single port transceivers.

The second port 610, shown in FIG. 6B, includes a multi-port transceiver 612 and a high density panel connector 614, such as an MPO, MXC, or other high density connector. The transceiver 612 connects to the multi-fiber high density connector 614 via fiber interconnect 616. The interconnect 616 may be an optical fiber cable, optical waveguide, or other mechanism to couple the optical signals between transceiver 612 and the front panel 34 (or rear panel 36) mounted fiber connector 614. This configuration is an example of combining multiple independent simplex or duplex optical ports from a transceiver for connection to a single multi-fiber cable 682. This permits aggregation of multiple independent fiber links for delivery to a single endpoint or to be separated within patch panels, hydra cables, or other mechanisms to be distributed to different end destinations or nodes.

Figure 6C:
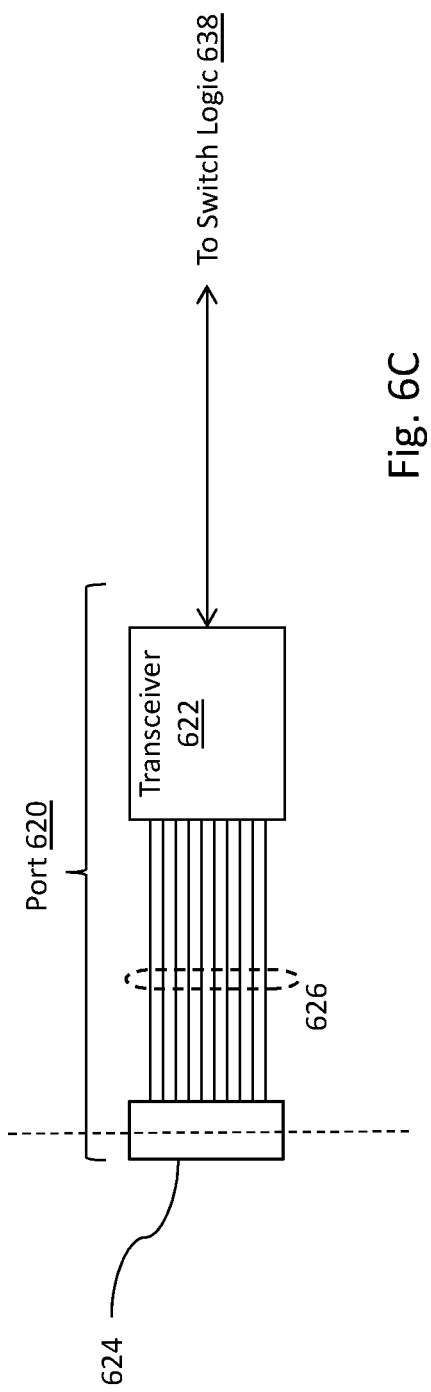

The third port 620, shown in FIG. 6C, includes a transceiver 622 and a high density multi-fiber connector 624, such as an MPO, or other high density fiber connector used for industry standard 40 Gbps and 100 Gbps applications. The transceiver 622 is connected to connector 624 via a compatible multi-fiber interconnect 626. The interconnect 626 may be an optical fiber cable, optical waveguide, or other mechanism to couple the optical signals between transceiver 622 and the front panel 34 (or rear panel 36) mounted fiber connector 624. This configuration supports industry 40 Gbps and 100 Gbps connections using 10 Gbps data rates per fiber, or 100 Gbps connections using 25 Gbps data rates per fiber. In this port embodiment, the transceivers bond individual transceiver ports together as low skew transmission and receive groups of channels to form multi-fiber connections to a data center network device connected to the far end of the cable that is connected to the connector 624. In this way, the transceiver can provide 40 Gbps, 100 Gbps or greater transmission rates. To support the industry standard application of IEEE 802.3ba 40GBASE-SR4 or IEEE 802.3ba 100GBASE-SR10, panel connector 624 can be configured according to the industry standard fiber configurations. With this implementation, 8 fibers would be used for data transmission for 40GBASE-SR4 applications, or 10 fibers would be used for 100GBASE-SR10 with the remaining fibers in the MPO connector not configured to pass data.

Figure 6D:
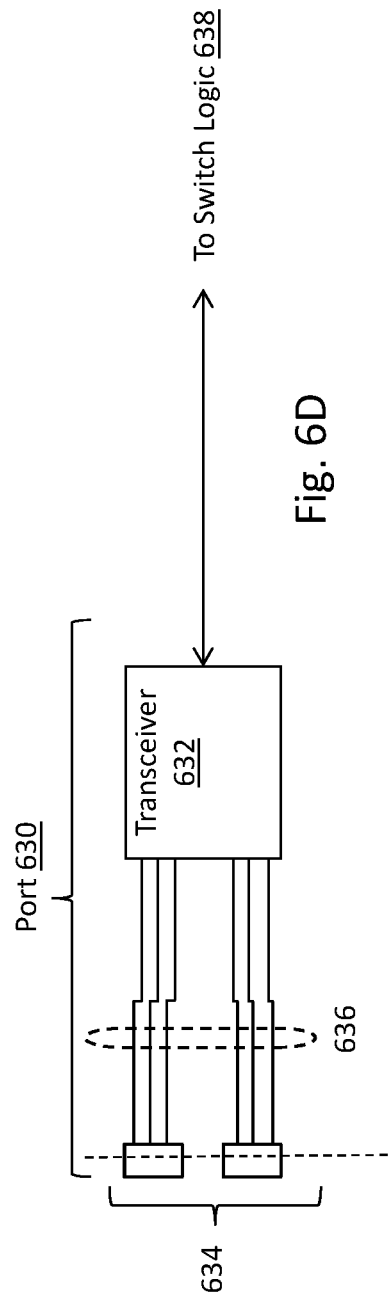

The fourth port 630, shown in FIG. 6D, includes a multi-port transceiver 632 and panel connectors 634, such as FC, SC, ST, LC, or other type of single or duplex fiber panel adapters, MPO, MXC, or other high density connectors, or any combination of these connectors. The transceiver 632 connects to the panel connectors 634 via fiber interconnect 636. The interconnect 636 may be an optical fiber cable, optical waveguide, or other mechanism to couple the optical signals between transceiver 632 and the front panel 34 (or rear panel 36) mounted fiber connectors 634. This configuration is an example of combining multiple independent simplex or duplex optical fibers from a multi-port transceiver for connection to single fiber cables or to multi-fiber cables 678 (seen in FIG. 6). This permits aggregation of multiple independent fiber links into multiple connector types for delivery to a single or different endpoints or to be separated within patch panels, hydra cables, or other mechanisms to be distributed to different end destinations.

The fifth port 640, shown in FIG. 6E, includes a multi-port transceiver (i.e., a transceiver with multiple connection ports) 642 and panel connectors 644, consisting of an MPO connector as well as FC, SC, ST, LC, or other type of single or duplex fiber panel adapters. The transceiver 642 connects to the panel connectors 644 via fiber interconnect 646. The interconnect 646 may be an optical fiber cable, optical waveguide, or other mechanism to couple the optical signals between transceiver 642 and the front panel (or rear panel) mounted fiber connectors 644. This configuration is an example of combining industry standard 40 Gbps and 100 Gbps connections using 10 Gbps data rates per fiber and independent 10 Gbps fiber connections in the same transceiver 642. In this port embodiment, the transceivers can bond four or 10 individual transceiver ports together as low skew transmission and receive groups of channels to form multi-fiber connections to a data center network device connected to the far end of the cable that is connected to connector 644. In this way, the transceiver can provide 40 Gbps or 100 Gbps transmission rates or transmission rates greater than 100 Gbps. To support the industry standard application of IEEE 802.3ba 40GBASE-SR4 or IEEE 802.3ba 100GBASE-SR10, panel connectors 644 can be configured with an MPO according to the industry standard fiber configurations plus additional connectors, such as FC, SC, ST, LC, or other type of single or duplex fiber panel adapters or an additional high density connector such as an MPO, MXC or other type to transport the remaining independent fiber links from transceiver 642. With this implementation, 8 fibers would be used for data transmission for 40GBASE-SR4 applications or 10 fibers would be used for 100GBASE-SR10 with the remaining fibers in the MPO connector not configured to pass data.

The sixth port 650, shown in FIG. 6F, includes a transceiver 652 and a high density multi-fiber connector 654, such as an MPO, or other high density fiber connector. The transceiver 652 connects to the panel connectors 654 via fiber interconnect 656. The interconnect 656 may be an optical fiber cable, optical waveguide, or other mechanism to couple the optical signals between transceiver 652, and the front panel 34 (or rear panel 36) mounted fiber connectors 654. This configuration is an example of combining industry standard 40 Gbps and 100 Gbps connections using 10 Gbps data rates per fiber and independent 10 Gbps fiber connections in the same transceiver 652 and in the same panel connector 654. In this port embodiment, the transceivers can bond four or ten individual transceiver ports together as low skew transmission and receive groups of channels to form multi-fiber connections to a data center network device connected to the far end of the cable that is connected to connector 654. In this way, the transceiver can provide 40 Gbps or 100 Gbps transmission rates or transmission rates greater than 100 Gbps. With this implementation, the connector 546 can carry all the fiber connections from transceiver 652. This permits aggregation of 40GBASE-SR4 applications or 100GBASE-SR10 along with independent fiber links for delivery to a single endpoint or to be separated within patch panels, hydra cables, or other mechanisms to be distributed to different end destinations.

Figure 6G:
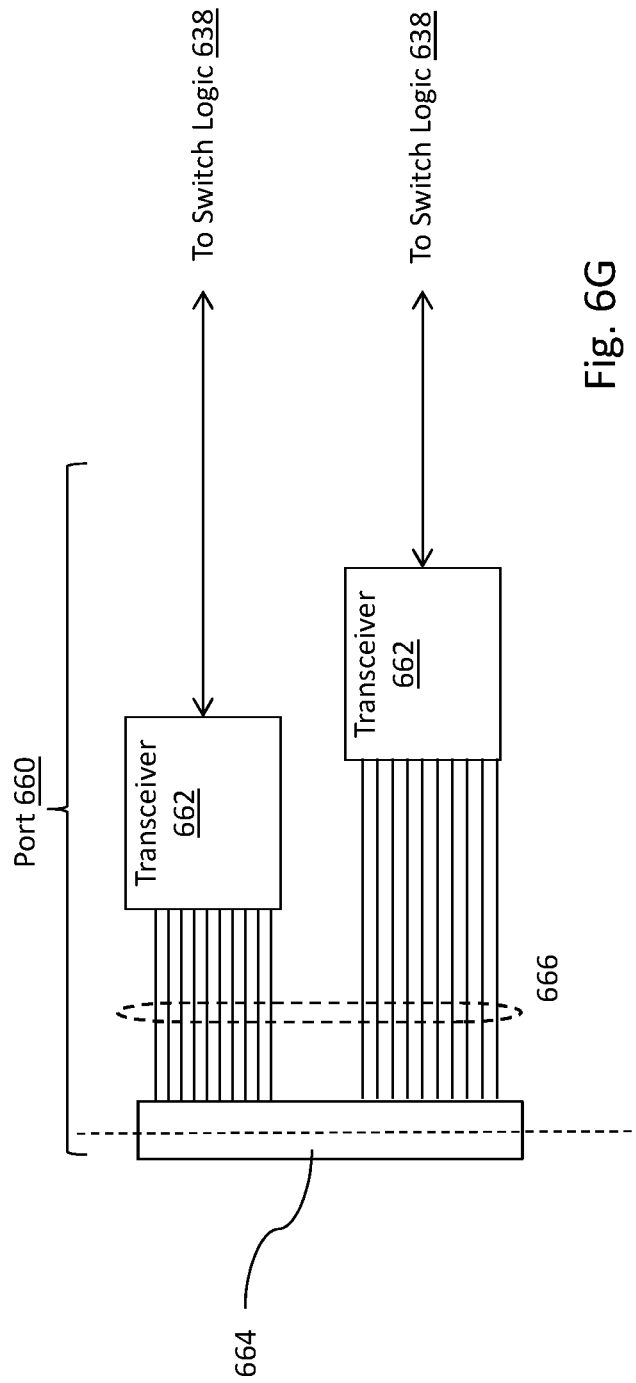

The seventh port 660, shown in FIG. 6G, includes multiple transceiver modules 662 and a high density panel connector 664, such as an MPO, MXC, or other high density connector. The transceiver modules 662 connect to the multi-fiber high density connector 664 via fiber interconnect 666. The interconnect 666 may be an optical fiber cable, optical waveguide, or other mechanism to couple the optical signals between transceivers 662 and the front panel 34 (or rear panel 36) mounted fiber connectors 664. This configuration is an example of combining multiple ports from one or more transceivers for connection to fiber connections in a single multi-fiber cable 666, and permits multiple simplex or duplex fiber, 40GBASE-SR4, 100GBASE-SR10, or other communications paths from one or more transceivers to a single high density connector 664 independent of each other. This permits aggregation of multiple 40GBASE-SR4 applications, 100GBASE-SR10 along with independent fiber links for delivery to a single endpoint or to be separated within patch panels, hydra cables, or other mechanisms to be distributed to different end destinations. Currently, high density MPO connectors can support up to 72 fibers and high density MXC connectors can support up to 64 fibers. As a result, fiber cable group 686 (seen in FIG. 6) can fan out to as many transceivers as needed to support the desired fibers for the connector 664.

In the embodiment of FIG. 6, each transceiver is preferably a multiport transceiver that is built into data center network device 60 instead of the embodiment of FIG. 5 where the transceiver is plugged into an SFF cage. Each transceiver is preferably dedicated for a particular industry standard application, such as a 40GBASE-SR4, 100GBASE-SR10 application, or can be individual ports configurable and either independent of one another or capable of being grouped together into a bonded high speed collection of fiber paths. Each transceiver may physically consist of a single multiport transceiver, or may be a multiport transmitter component paired with a multiport receiver component. Examples of suitable multiport transceivers include the FBOTD10SL1C00 12-Lane Boardmount Optical Assembly manufactured by Finisar Corp. Examples of multiport transmitter components and paired multiport receiver components include the AFBR-77D1SZ—Twelve-Channel Transmitter and AFBR-78D1SZ—Twelve-Channel Receiver manufactured by Avago Technologies. The transceivers may be configured in the housing 32 in a staggered arrangement away from the front panel 34 (or rear panel 36) such that the transceivers are not connected directly to the front panel 34 (or rear panel 36). This configuration allows more connectors to be connected to the front panel (or rear panel) of the device 60, thus increasing the panel density of the device. By utilizing multiport transceivers and building them into the data center network device in a staggered arrangement as described, the panel density of the data center network device is further increased over the increased panel density provided by the embodiment of FIG. 5. In another embodiment, single transmission connections, such as 1 Gbps, 25 Gbps, 56 Gbps, or other transmission rates, may be intermixed in the same high density connector, e.g., an MPO or MXC or other high fiber connector, with Wavelength Division Multiplexor (WDM) fiber transmission schemes, such as Coarse Wavelength Division Multiplexor (CWDM), Dense Wavelength Division Multiplexor (DWDM), or other WDM capabilities, such as silicon photonics interfaces where multiple wavelengths may be transmitted or received over a single input fiber.

For clarity, a port as described herein is a component having a transceiver and connector, as described with reference to FIG. 5. For the embodiment of FIG. 6, a transceiver port relates to multiport transceivers where each transceiver port of the transceiver is independently capable of receiving a data stream from an external medium connected to the data center network device, and transmitting a data stream to the external medium connected to the data center network device.

Figure 7:
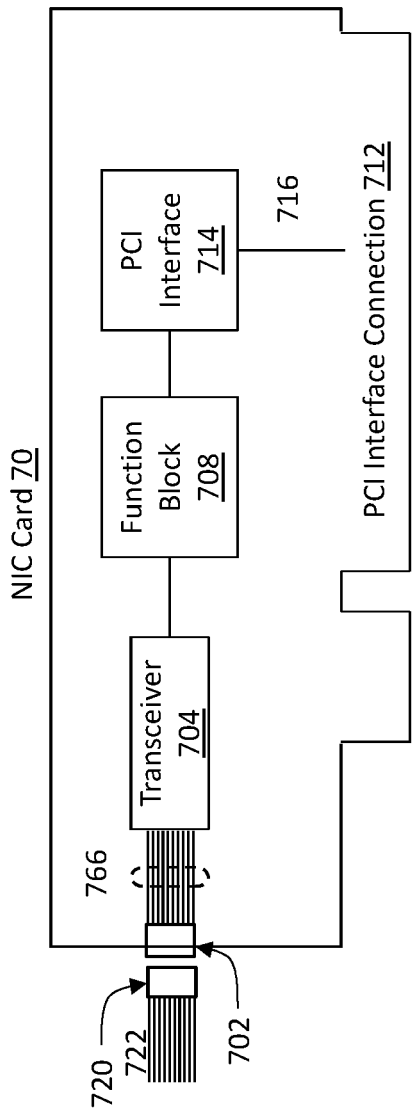
FIG. 7 is a block diagram of an exemplary embodiment of a data center NIC according to the present application with internal high density ports.

Referring now to FIG. 7, another embodiment of a data center network device according to the present application is disclosed. In this embodiment, a Network Interface Card (NIC) 70 is shown with a port configured by high density connector 702 and multiport transceiver 704. Like the above described embodiments, the transceiver 704 may be a transceiver chip mounted to the NIC 70, or a pluggable transceiver and an SSF cage mounted to the NIC 70, or a separate transmitter and receiver mounted to the NIC 70. The NIC is a plug-in card to a data center network device which provides an interface for the data center network device to interconnect to an external medium. The NIC card contains the desired interface for a particular application, such as a copper Ethernet interface, Wi-Fi interface, serial port, Fibre Channel over Ethernet (FCoE) interface, or other media interface. In the embodiment of FIG. 7, the NIC interconnects to the data center network device via a Peripheral Component Interconnect (PCI) Interface Connection 712, as one common device interconnect standard. In this embodiment, the data center network device CPU configures and controls the NIC via PCI interface logic 714 over PCI Interface bus 716.

Preferably, each NIC card is designed for a specific application or implementation. In this embodiment, function block 708 provides control logic to convert the PCI Interface data stream format into a data stream format for transceiver 704 and vice versa. The transceiver 704 provides the OSI Layer 1 physical layer interface for the external port 702 interface, while functional block 708 provides the OSI layer 2 processing for the external communications. Depending upon the NIC implementation, additional OSI Layer functions may also be included within the NIC card. Transceiver 704 connects to the multi-fiber high density connector 702 via fiber interconnect 766. The interconnect 766 may be an optical fiber cable, optical waveguide, or other mechanism to couple the optical signals between transceiver 704 and the NIC edge panel mounted fiber connectors 702.

The NIC can be installed within a data center network device to create a high density data center network device as described herein. In the embodiment of FIG. 7, one transceiver 704 is shown on the NIC 70, but more than one transceiver module may be added to the NIC 70 similar to the embodiments shown in FIGS. 5 and 6. The ports can be configured to support individual 10 Gbps data rates, 40 Gbps, or 100 Gbps data rates, or data rates greater than 100 Gbps, as described above. Similarly, the connections can be individual fiber connections, IEEE802.3ba 40 GBASE-SR4 optical lane assignments, IEEE802.3ba 100GBASE-SR10 optical lane assignments, or may be dynamically configured by the data center network device CPU.

Each fiber connector may have one or more associated Light Emitting Diodes (LEDs) used for status and control information. Each LED may be a single color or multicolor LED as determined for the product implementation. Each LED may have a blink rate and color used to identify specific states for the port. The LEDs can be illuminated by the data center network device CPU to indicate information, and may include port status for a single active port or multiple ports for each connector. The LEDs can also be used during installation or Moves-Adds-and-Changes to indicate to data center personnel which connector port is to be serviced. The data center network device CPU may also indicate port status information by a Liquid Crystal Display (LCD) located near the panel connectors.

Figure 8:
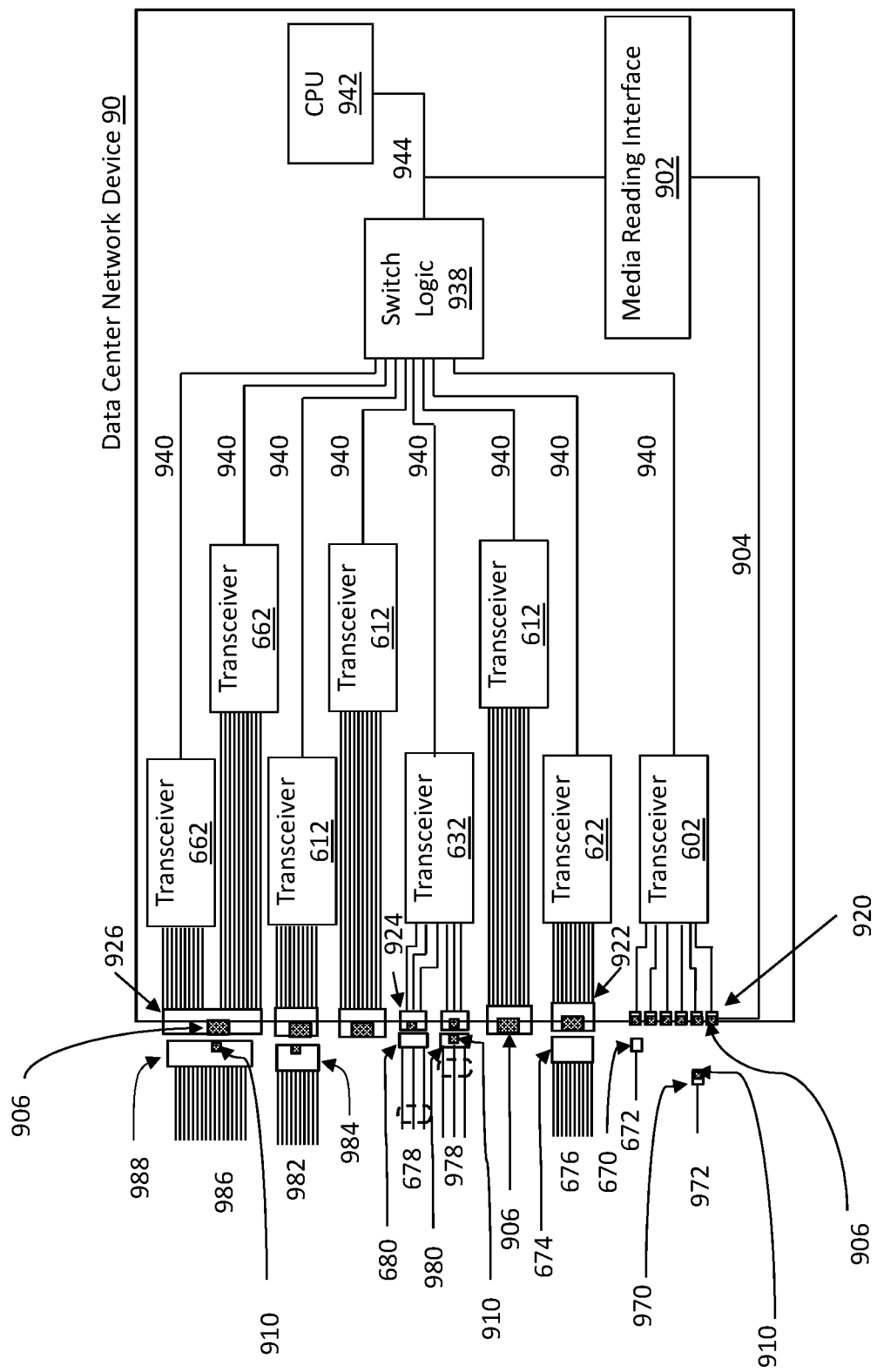
FIG. 8 is a block diagram of an exemplary embodiment of a data center network device according to the present application with internal high density ports and intelligent managed connectivity capabilities.

Referring to FIG. 8, another embodiment of a data center network device 90 according to the present application is disclosed. In this embodiment, the data center network device is similar to the device described above with reference to FIG. 6 as well as the Network Interface card shown in FIG. 7, and permits the implementation of the capability to interpret cable information from cables connected to the data center network device 90, by obtaining intelligent information from within the cables. In addition to interfacing to standard cables 672, 676, 678, and others not shown, adapters 920, 922, 924, 926 have the capability, via interface 906, to detect the presence of a cable connector 670, 674, 680, 970, 980, 984, 988, and others not shown, inserted into intelligent adapter 920, 922, 924, 926, and in the case of intelligence equipped cable connector 970, 980, 984, 988, and others not shown, read specific cable information by reading the information in cable media 910. To ascertain cable information, the data center network device 90 may be designed with ninth wire technologies interfaces, RFID tagging technology interfaces, connection point ID (CPID) technology interfaces, or other cable managed intelligence technologies. In another embodiment, the data center network device 90 may be designed with one or more of these different technology interfaces in order to provide the capabilities of supporting more than one particular managed intelligent technology.

Each data center network device 90 equipped with intelligent cable interfaces has the capability to determine the cable presence and/or cable information available to the interface depending upon the information provided from the intelligent cable.

The cable information read from media interface adapter 906 via media interface bus 904 by media reading interface 902 and provided to CPU 942 may include for each cable connection of the cable type, cable configuration, cable length, cable part number, cable serial number, and other information available to be read by media reading interface 902. This information is collected by media reading interface 902 and passed to the CPU 942 via control bus 944. The CPU 942 can use this information to determine end to end information regarding the overall communication path and the intermediary connections which make up an end-to-end path.

Each embodiment which contains multiport transceivers within the switch logic 538, 692, 938 by CPU 542, 696, 942 and also within the switch logic functional block 708 by the NIC device CPU (not shown), can be configured for multiple single connection applications and for multifiber parallel connections, such as IEEE 802.3ba 40GBASE-SR4 or 100GBASE-SR10 applications. Because CPU 542, 696, 942 and the NIC device CPU controls switch logic 538, 692, 938, and switch logic functional block 708, the switch logic 538, 692, 938 and the switch logic functional block 708 can also be dynamically be reconfigured to support different multiple single fiber connection applications and multifiber parallel connections, such as IEEE 802.3ba 40GBASE-SR4 or 100GBASE-SR10 applications simultaneously.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system."

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is also to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A data center network device, comprising:
    a housing containing one or more on-board fiber optic transceivers, the housing having one or more connection panels forming at least a portion of an exterior of the housing;
    a plurality of fiber optic connectors attached to each of the one or more connection panels, each of the plurality of optical connectors having an external connector portion adapted to connect to an optical communication path that is external to the housing and an internal connector portion adapted to connect to an optical communication path that is internal to the housing; and
    a plurality of internal fiber optic communication paths optically coupled between the one or more fiber optic transceivers and the internal connector portion of the plurality of fiber optic connectors.

2. The data center network device according to claim 1, wherein the plurality of fiber optic connectors comprise simplex, duplex or high density fiber optic connectors.

3. The data center network device according to claim 2, wherein the simplex and duplex fiber optic connectors comprise LC connectors.

4. The data center network device according to claim 2, wherein the high density fiber optic connectors comprise MPO or MXC connectors.

5. The data center network device according to claim 1, wherein at least one of the fiber optic connectors comprises a fiber optic coupler, and wherein the external connector portion of the fiber optic coupler is substantially the same as the internal connector portion of the fiber optic coupler.

6. The data center network device according to claim 5, wherein the external connector portion and the internal connector portion of the fiber optic coupler comprises one of simplex connectors and duplex connectors.

7. The data center network device according to claim 6, wherein the simplex connectors and the duplex connectors comprise LC connectors.

8. The data center network device according to claim 5, wherein the external connector portion and the internal connector portion of the fiber optic coupler comprise high density fiber connectors.

9. The data center network device according to claim 8, wherein the high density fiber connectors comprise one of MPO connectors, MPX connectors and multi-fiber ribbon connectors.

10. The data center network device according to claim 1, wherein at least one of the fiber optic connectors comprises a fiber optic adapter, and wherein the external connector portion of the fiber optic adapter differs from the internal connector portion of the fiber optic adapter.

11. The data center network device according to claim 10, wherein the external connector portion of the fiber optic adapter comprises a high density fiber connector, and the internal connector portion of the fiber optic adapter comprises a plurality of simplex connectors, a plurality of duplex connectors or a combination of at least one simplex connector and at least one duplex connectors.

12. The data center network device according to claim 11, wherein the simplex connectors or the duplex connectors comprise LC connectors.

13. The data center network device according to claim 11, wherein the high density fiber connectors comprise one of MPO connectors, MPX connectors and multi-fiber ribbon connectors.

14. The data center network device according to claim 1, wherein the one or more on-board fiber optic transceivers comprise a plurality of on-board fiber optic transceivers, and wherein the internal connector portion of one of the plurality of fiber optic connectors is optically coupled to one of the plurality of on-board fiber optic transceivers using one of the plurality of fiber optic communication paths.

15. The data center network device according to claim 1, wherein the one or more on-board fiber optic transceivers comprise a plurality of on-board fiber optic transceivers, and wherein the internal connector portion of one of the plurality of fiber optic connectors is optically coupled to more than one of the plurality of on-board fiber optic transceivers using more than one of the plurality of fiber optic communication paths.

16. The data center network device according to claim 1, wherein the one or more transceivers comprise single port transceivers, multiport transceivers or a combination of single port transceivers and multiport transceivers.

17. A data center network device, comprising:
    a housing containing having one or more connection panels forming at least a portion of an exterior of the housing;
    at least one printed circuit board positioned within the housing, the at least one printed circuit board having at least one transceiver and at least one fiber optic connector mounted thereto;
    at least one fiber optic connector attached to each of the one or more connection panels, each fiber optic connector having an external connector portion adapted to connect to an optical communication path that is external to the housing and an internal connector portion adapted to connect to an optical communication path that is internal to the housing; and
    at least one optical communication path optically coupled between the at least one fiber optic connector mounted to the printed circuit board and the internal connector portion of the at least one fiber optic connector.

18. The data center network device according to claim 17, wherein the one or more transceivers comprise single port transceivers, multiport transceivers or a combination of single port transceivers and multiport transceivers.

19. The data center network device according to claim 17, wherein the one or more transceivers comprise a plurality of transceivers.

* * * * *